United States Patent
Ritzema

[19]

[11] Patent Number: 6,024,190
[45] Date of Patent: Feb. 15, 2000

[54] ACOUSTICAL BARRIER WITH RIBBED DECOUPLER

[75] Inventor: Kenneth T. Ritzema, Clarkston, Mich.

[73] Assignee: Cascade Engineering, Inc., Grand Rapids, Mich.

[21] Appl. No.: 09/003,983

[22] Filed: Jan. 7, 1998

Related U.S. Application Data

[60] Provisional application No. 60/034,190, Jan. 7, 1997.

[51] Int. Cl.[7] ...................................................... E04B 1/82
[52] U.S. Cl. .......................................... 181/286; 181/290
[58] Field of Search ..................................... 181/207, 208, 181/286, 288, 290, 291, 292, 294, 295

[56] References Cited

U.S. PATENT DOCUMENTS

| | | | |
|---|---|---|---|
| 4,705,139 | 11/1987 | Gahlau et al. | 181/290 |
| 4,782,913 | 11/1988 | Hoffmann et al. | 181/286 |
| 5,483,028 | 1/1996 | Holwerda | 181/207 |

FOREIGN PATENT DOCUMENTS

| | | |
|---|---|---|
| 0 121 947 | 10/1984 | European Pat. Off. . |
| 0 255 332 | 2/1988 | European Pat. Off. . |
| 0 474 593 | 3/1992 | European Pat. Off. . |
| 94 08 118 U1 | 10/1995 | Germany . |
| 59-186751 | 10/1984 | Japan . |
| 449979 | 7/1936 | United Kingdom . |
| WO 91/09728 | 7/1991 | WIPO . |

*Primary Examiner*—Khanh Dang
*Attorney, Agent, or Firm*—Radar, Fishman, Grauer & McGarry, An Office of Rader, Fishman & Grauer PLLC

[57] ABSTRACT

An acoustical barrier for blocking the transfer of sound through a barrier wall. The acoustical barrier comprises a sound absorbing layer and a decoupling layer mounted to the sound absorbing layer and spacing the sound absorbing layer from the barrier wall. The decoupling layer has a constructoin defining multiple voids to reduce the quantity of material used to construct the decoupling layer and to reduce the surface area of the decoupling layer contracting the barrier wall. Preferably, the decoupling layer has multiple protrusions such as ribs between which are interstitial spaces defining the voids.

20 Claims, 1 Drawing Sheet

ACOUSTICAL BARRIER WITH RIBBED DECOUPLER

CROSS REFERENCE

This application claims priority to U.S. application Ser. No. 60/034,190 filed Jan. 7, 1997.

BACKGROUND OF THE INVENTION

1. Field of the Invention

This invention relates to an acoustical barrier for reducing the transfer of sound through a panel member; and more specifically, to a wall-mounted acoustical barrier with a decoupler for separating the acoustical barrier from the panel to enhance the sound reducing properties of the acoustical barrier.

2. Description of Related Art

Acoustical barriers are commonly used in contemporary motor vehicles to reduce engine and road noise. Most vehicles have a sheet metal barrier wall, a firewall, between the engine compartment and the passenger compartment, physically separating the engine compartment and the passenger compartment. Unfortunately, the metal barrier wall readily transmits sound from the engine compartment into the passenger compartment.

Previous acoustical barriers have been constructed to reduce or eliminate sound transfer through the barrier wall. Typically, these prior acoustic barriers generally comprises a slab or cast foam or other decoupling layer and a mass layer, both of which are sheets coextensive with the barrier wall. The foam layer is positioned against the barrier wall and the mass layer overlies the foam layer within the passenger compartment. The foam layer serves to separate or decouple the mass layer from the barrier wall to minimize the transmission of sound vibrations through the mass layer.

In order to maximize sound decoupling, the mass layer should be spaced a predetermined distance from the barrier wall, which is typically established by the thickness of the decoupling layer. The decoupling layer has a predetermined minimal thickness so as to provide sufficient sound attenuation between the barrier wall and the mass layer. Acoustic barriers commonly use a slab or cast foam as the decoupling layer. The slab is typically of uniform thickness before installation, and portions of the decoupling layer corresponding to unrecessed areas of the barrier wall are compressed so that the one side of the decoupling layer conforms to the surface of the barrier wall, while the other side conforms to the surface of the mass layer. Cast foam is variable in thickness and typically fills the entire space between the barrier wall and the mass layer with foam. Although the previous solutions are acceptable, excess decoupling material must be used. The present invention relates to an acoustical barrier that minimizes the amount of decoupling material and production costs in the decoupler.

SUMMARY OF INVENTION

The invention relates to a barrier wall and/or an acoustical barrier for reducing the transfer of sound through the barrier wall. Preferably, the acoustical barrier is mounted to the barrier wall and comprises a sound absorbing layer and a decoupling layer, which spaces the sound absorbing layer from the barrier wall when the acoustical barrier is mounted to the barrier wall. The decoupling layer has areas of reduced thickness and spacers which form at least one void between the sound absorbing layer and the decoupling layer.

Preferably, the decoupling layer comprises multiple protrusions separated by at least one interstitial space to define the at least one void. The multiple protrusions can be spaced ribs or projections. The decoupling layer is compressed to the minimum thickness, except for uncompressed portions. The decoupling layer is made from flexible foam. The sound absorbing layer is more dense than the decoupling layer.

BRIEF DESCRIPTION OF THE DRAWINGS

The invention will now be described with reference to the drawings wherein.

DESCRIPTION OF THE PREFERRED EMBODIMENTS

Figure 1:
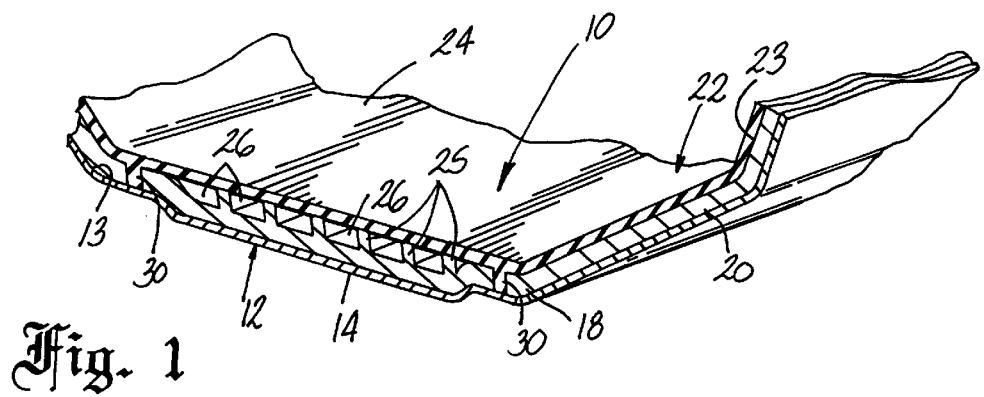
FIG. 1 is a perspective view of a portion of an acoustic barrier according to the invention.
Figure 2:
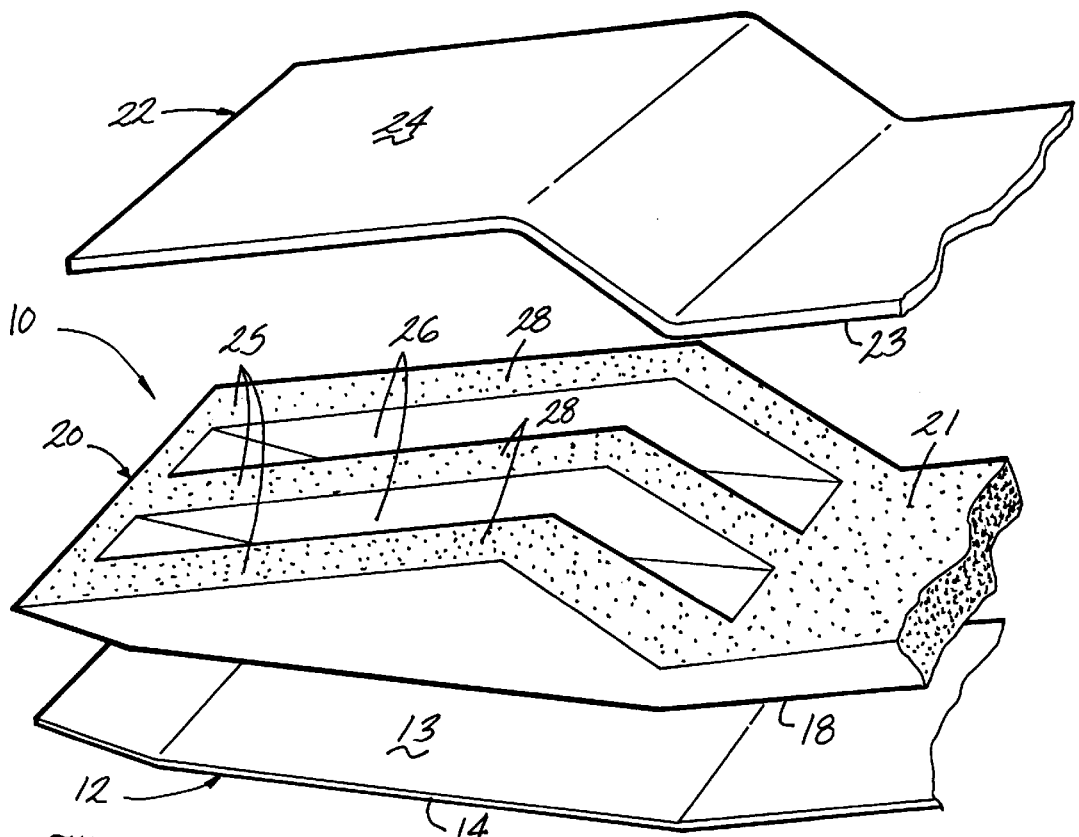
FIG. 2 is an exploded perspective view of another portion of an acoustic barrier according to the invention.

Referring now to FIGS. 1 and 2, an acoustic barrier 10 according to the invention is mounted to a barrier wall 12. The acoustic barrier 10 reduces or prevents the transfer of sound from one side of the barrier wall 12 to the other side. In a vehicle application, the barrier wall 12 can be a firewall between the engine compartment and a passenger compartment of the vehicle. The acoustic barrier 10 is generally mounted on the side of the barrier wall 12 that faces the passenger compartment and prevents the transfer of engine and road noise from the engine compartment to the passenger compartment. The acoustic barrier 10 can, however, be mounted to the side of the barrier wall that faces the engine compartment, or on any other vehicle or other type of wall.

Typically, the barrier wall 12 has an uneven upper surface 13 with multiple indentations 14 of various sizes and shapes. For purposes of simplicity, only a small portion of the barrier wall 12 and acoustic barrier 10 is shown. It should be understood that both the barrier wall 12 and the acoustic barrier 10 extend across the entire vehicle front and wheel wells. The barrier wall 12 has many indentations and bumps to accommodate the installation of various components on both sides of the wall 12. The indentations 14 are necessary and vehicle specific so that the barrier wall 12 can fit within and around other structural elements of a vehicle.

The acoustic barrier 10 according to the invention comprises a decoupling layer 20 and a mass layer 22. A lower surface 18 of the decoupling layer 20 is molded to conform to the contour of the upper surface 13 of the barrier wall 12, and an upper surface 21 of the decoupling layer 20 is molded to conform to the lower surface 18 of the mass layer 22. In the installed position, the lower decoupling surface 18 abuts the barrier wall 12 and the upper decoupling surface 21 abuts the mass layer 22 to separate the mass layer from the barrier wall and to decouple the transfer of sound between the mass layer and barrier wall. The decoupling occurs because the properties of the decoupling layer are such that it does not readily vibrate or transfer sound when it is in direct contact with the barrier wall 12. The acoustic barrier 10 performs the sound blocking function best if the decoupling layer 20 is of a minimum predetermined thickness. The decoupling layer 20 is preferably molded of a flexible foam, such as polyurethane, but other low density, insulating materials can be used.

The decoupling layer is preferably provided with multiple voids or air pockets that reduce the area of the decoupling layer in contact with the barrier wall to further reduce the transfer of vibrations through the barrier wall in addition to the vibration reduction from the material characteristics of the decoupling layer. Preferably, the decoupling layer 20 has a series of integrally molded ribs or projections 25 extending therefrom with interstitial spaces defining voids or air pockets 26 formed between the projections. An outer free end 28 of each projection 25 is continuous with the upper surface 21 of the decoupling layer 20. Since the decoupling layer 20 is molded, the material is normally in a non-compressed state when installed, even in places of uneven surface contours on the barrier wall 12 and the mass layer 22. Thus, the decoupling layer 20 is of non-uniform thickness and follows the contour of the barrier wall 12 and the lower surface of the mass layer 22 with substantially no compression.

The decoupling layer 20 has a minimum and variable thickness, which is dictated by the specific sound absorbing requirements of a specific application, eliminating the need to compress portions of the decoupling layer 20. The molded decoupling layer, including the air pockets 26, therefore reduces the amount of material that would otherwise be required with the prior art decoupling layer while maintaining an acceptable degree of sound attenuation.

The mass layer 22 is relatively dense and is preferably made from rubber, modified polypropylene or other thermoplastic polymer filled with a sound deadener such as barium sulfate. A lower surface 23 of the mass layer 22 abuts the upper surface 21 of the decoupling layer 20 when the acoustic barrier 10 is assembled. The mass layer has an upper surface 24 that is even and smooth. The lower surface 23 of the mass layer 22 abuts the decoupling layer 20 and can have one or more spacer ribs 30 that project downwardly from the lower surface 23. The spacer ribs 30 are adapted to abut the upper surface 13 of the barrier wall 12 such that the mass layer 22 is maintained a predetermined distance from the barrier wall when installed in the vehicle. The spacer ribs 30 can have a variety of shapes depending on the particular application and can be of different elevations to accommodate variations in surface contour. Preferably, the mass layer 22 and the spacer ribs 30 are injection molded as a single piece. The number and size of the spacer ribs in any given area is minimized to support the mass layer.

The acoustic barrier 10 according to the invention conforms to the uneven surface of the barrier wall 12 with the decoupling layer 20 in substantially uniform contact with the barrier wall 12, while the exposed surface of the mass layer 22 presents a smooth, even and aesthetically pleasing surface to the interior of the passenger compartment. The acoustic barrier 10 uses substantially less material than previous acoustic barriers because of the air pockets 26 and the non-compression of at least a portion of the decoupling layer. The use of less decoupling material is advantageous because the material and production costs of the decoupling layer are relatively more expensive than the material and production costs of the mass layer. Thus, the acoustic barrier 10 provides a less expensive and easier to manufacture acoustic barrier than previous acoustic barriers. Additionally, since a reduced surface area, when compared to the total footprint of the decoupling layer, contacts the barrier wall, fewer vibrations will pass through the decoupling layer to the mass layer. While particular embodiments of the invention have been shown, it will be understood, of course, that the invention is not limited thereto since modifications may be made by those skilled in the art, particularly in light of the foregoing teachings.

Reasonable variation and modification are possible within the scope of the foregoing disclosure of the invention without departing from the spirit of the invention.

I claim:

1. A dash mat for reducing the transfer of sound through a barrier wall with an irregular upper surface formed by an irregularity, the dash mat comprising:

a decoupling layer having an upper surface and a lower surface comprising:
 a substantially uniform thickness portion having a bottom surface shaped to conform to the barrier wall irregular upper surface when the decoupling layer is mounted to the barrier wall and an irregular top surface having an irregularity that substantially corresponds to the barrier wall irregularity;
 a variable thickness portion extending from the uniform thickness portion top surface at the irregularity of the uniform thickness portion and terminating in a top surface substantially at a height equal to the uniform thickness portion top surface surrounding the irregularity;
 wherein the decoupling layer lower surface is irregular and defined by the uniform thickness portion bottom surface and the decoupling layer upper surface is substantially smooth and defined by the uniform thickness portion top surface and the variable thickness portion top surface; and
an elastomeric sound absorbing layer having an upper surface and a lower surface and the lower elastomeric sound absorbing layer surface is mounted to the decoupling layer upper surface.

2. The dash mat according to claim 1, wherein the variable thickness portion has at least one void to reduce the amount of material used to form the decoupling layer.

3. The dash mat according to claim 2, wherein the variable thickness portion includes protrusions separated by at least one interstitial space defining the at least one void.

4. The dash mat according to claim 1, wherein the decoupling layer is made from flexible foam.

5. The dash mat according to claim 4, wherein the flexible foam is polyurethane.

6. The dash mat according to claim 1, wherein the sound absorbing layer is more dense than the decoupling layer.

7. The dash mat according to claim 6, wherein the sound absorbing layer is made from one of rubber, polypropylene, and a thermoplastic polymer.

8. The dash mat according to claim 1, wherein the uniform thickness portion has multiple irregularities.

9. The dash mat according to claim 8, wherein the variable thickness portion comprises multiple discrete areas and each area corresponds to an irregularity in the uniform thickness portion.

10. The dash mat according to claim 1, wherein the irregularity is a protrusion.

11. A barrier wall with an irregularity forming an irregular upper surface in combination with a dash mat for reducing the transfer of sound through the barrier wall, the dash mat comprising:

a decoupling layer having an upper surface and a lower surface comprising:
 a substantially uniform thickness portion having a bottom surface shaped to conform to the barrier wall irregular upper surface, when the decoupling layer is mounted to the barrier wall, and an irregular top surface having an irregularity that substantially corresponds to the barrier wall irregularity;
 a variable thickness portion extending from the uniform thickness portion top surface at the uniform thickness portion irregularity and terminating in a top surface substantially at a height equal to the uniform thickness portion top surface surround the irregularity;
 wherein the decoupling layer lower surface is irregular and defined by the uniform thickness bottom surface and the decoupling layer upper surface is substantially smooth and defined by the uniform thickness portion top surface and the variable thickness portion top surface; and an elastomeric sound absorbing layer having an upper surface and a lower surface and the lower surface is mounted to the decoupling layer upper surface.

12. The combination according to claim 11, wherein the variable thickness portion has at least one void to reduce the amount of material used to form the decoupling layer.

13. The combination according to claim 12, wherein the variable thickness portion includes protrusions separated by at least one interstitial space defining the at least one void.

14. The combination according to claim 12, wherein the decoupling layer is made from flexible foam.

15. The combination according to claim 14, wherein the flexible foam is polyurethane.

16. The combination according to claim 14, wherein the sound absorbing layer is rnoie dense than the decoupling layer.

17. The combination according to claim 16, wherein the sound absorbing layer is made from one of rubber, polypropylene, and a thermoplastic polymer.

18. The combination according to claim 16, wherein the uniform thickness portion has multiple irregularities.

19. The combination according to claim 18, wherein the variable thickness portion comprises multiple discrete areas and each area corresponds to an irregularity in the uniform thickness portion.

20. The dash mat according to claim 11, wherein the irregularity is a protrusion.

* * * * *

UNITED STATES PATENT AND TRADEMARK OFFICE
CERTIFICATE OF CORRECTION

PATENT NO.: 6,024,190

DATED: February 15, 2000

INVENTOR(S): Kenneth T. Ritzema

It is certified that error appears in the above-identified patent and that said Letters Patent is hereby corrected as shown below:

Claim 16, column 6, line 2, "rnoie", should read --more--.

Signed and Sealed this

Nineteenth Day of December, 2000

Attest:

Q. TODD DICKINSON

*Attesting Officer*     *Commissioner of Patents and Trademarks*